US011724957B2

(12) United States Patent
Fu

(10) Patent No.: US 11,724,957 B2
(45) Date of Patent: Aug. 15, 2023

(54) BIOACTIVE BORATE GLASSES

(71) Applicant: CORNING INCORPORATED, Corning, NY (US)

(72) Inventor: Qiang Fu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 676 days.

(21) Appl. No.: 16/809,173

(22) Filed: Mar. 4, 2020

(65) Prior Publication Data
US 2020/0199010 A1    Jun. 25, 2020

Related U.S. Application Data

(63) Continuation of application No. PCT/US2019/061080, filed on Nov. 13, 2019.

(60) Provisional application No. 62/769,829, filed on Nov. 20, 2018, provisional application No. 62/805,497, filed on Feb. 14, 2019.

(51) Int. Cl.
C03C 3/066       (2006.01)
C03C 12/00       (2006.01)
C03C 13/00       (2006.01)

(52) U.S. Cl.
CPC ............. C03C 3/066 (2013.01); C03C 12/00 (2013.01); C03C 13/00 (2013.01); C03C 2204/02 (2013.01)

(58) Field of Classification Search
CPC .......... C03C 3/066; C03C 3/064; C03C 3/14; C03C 3/145; C03C 3/19; C03C 3/21; C03C 4/0021; C03C 12/00; C03C 13/00; C03C 2204/02
See application file for complete search history.

(56) References Cited

U.S. PATENT DOCUMENTS

| | | | |
|---|---|---|---|
| 5,977,428 A | 11/1999 | Bozigian et al. | |
| 6,338,751 B1 | 1/2002 | Litkowski et al. | |
| 7,495,146 B2 | 2/2009 | Crisp | |
| 7,605,298 B2 | 10/2009 | Bechert et al. | |
| 8,034,732 B2 | 10/2011 | Kobayashi et al. | |
| 8,173,154 B2 | 5/2012 | Jung et al. | |
| 8,741,269 B2 | 6/2014 | Mandadi et al. | |
| 9,168,272 B2 | 10/2015 | Hill et al. | |
| 9,567,259 B2 | 2/2017 | Amin et al. | |
| 9,622,483 B2 | 4/2017 | Bookbinder et al. | |
| 10,647,962 B2 | 5/2020 | Deng et al. | |
| 2001/0023156 A1 | 9/2001 | Nomura | |
| 2004/0228905 A1 | 11/2004 | Greenspan et al. | |
| 2006/0142413 A1 | 6/2006 | Zimmer et al. | |
| 2011/0165221 A1* | 7/2011 | Jung ................... | A61L 26/0085 424/673 |
| 2012/0021031 A1 | 1/2012 | Chopra et al. | |
| 2017/0036954 A1 | 2/2017 | Kuksenkova et al. | |
| 2017/0247281 A1 | 8/2017 | Day et al. | |
| 2017/0274118 A1 | 9/2017 | Nazhat et al. | |
| 2017/0326266 A1 | 11/2017 | Sawasato et al. | |
| 2017/0340666 A1 | 11/2017 | Deng et al. | |
| 2017/0342382 A1 | 11/2017 | Deng et al. | |
| 2017/0349876 A1 | 12/2017 | Deng et al. | |
| 2018/0263244 A1 | 9/2018 | Kobayashi et al. | |
| 2019/0161392 A1 | 5/2019 | Deng et al. | |
| 2019/0161393 A1 | 5/2019 | Deng et al. | |

FOREIGN PATENT DOCUMENTS

| | | |
|---|---|---|
| CN | 1753840 A | 3/2006 |
| WO | 2010/115037 A2 | 10/2010 |

OTHER PUBLICATIONS

Chinese Patent Application No. 201980076605.X, Office Action dated Jul. 12, 2022, 5 pages (English translation Only), Chinese Patent Office.
Davari et al; "Dentin Hypersensitivity: Etiology, Diagnosis and Treatment; A Literature Review"; J. Dent. Shiraz Univ Med Sci; 2013; 14(3) pp. 136145.
Drago et al; "Recent Evidence on Bioactive Glass Antimicrobial and Antibiofilm Activity: A Mini-Review," Materials, 2018, 11: 326; 11 Pages.
Fraga; "Relevance, Essentiality and Toxicity of Trace Elements in Human Health"; Molecular Aspect of Medicine 2005, 26; pp. 235-244.
Guo et al; "Factors Affecting Wound Healing," J Dent Res, 2010, 89: pp. 219-229.
Hench; "Bioceramics"; J Am Ceram Soc, 1998, 81: pp. 1705-1728.
International Search Report and Written Opinion of the International Searching Authority; PCT/US2019/061080; dated Feb. 4, 2020; 12 Pages; European Patent Office.
Kulal et al; "An In-Vitro Comparison of Nano Hydroxyapatite, Novamin and Proargin Desensitizing Toothpastes—A SEM Study"; Journal of Clinical and Diagnostic Research 2016, vol. 10(10) pp. ZC51-ZC54.
Low et al; "Reduction in Dental Hypersensitivity With Nano-Hydroxyapatite, Potassium Nitrate, Sodium Monoflurophosphate and Antioxidants"; The Open Dentistry Journal, 2015, 9; pp. 92-97.
Miglani et al; "Dentin Hypersensitivity: Recent Trends in Management"; J. Conserv. Dent. 2010, 13(4) pp. 218-224.
Mijnendonckx et al; "Antimicrobial Silver: Uses, Toxicity and Potential for Resistance"; Biomatals, 2013, 26; pp. 609-621.

(Continued)

*Primary Examiner* — Elizabeth A. Bolden
(74) *Attorney, Agent, or Firm* — Travis B. Gasa; Russell S. Magaziner

(57) ABSTRACT

An antibacterial composition, includes: a borate-based glass material having a composition of: 0-25 wt. % $SiO_2$, 30-75 wt. % $B_2O_3$, 0-10 wt. % $P_2O_5$, 0-30 wt. % $Al_2O_3$, 0-5 wt. % $Li_2O$, 1-25 wt. % $Na_2O$, 0-15 wt. % $K_2O$, 0-10 wt. % MgO, 10-25 wt. % CaO, 12-30 wt. % MO, 8-25 wt. % $R_2O$, and 30-75 $(B_2O_3+Al_2O_3)$, such that at least one of $P_2O_5$ or $Al_2O_3$ is present, MO is the sum of MgO, CaO, SrO, and BaO, $R_2O$ is the sum of $Na_2O$, $K_2O$, $Li_2O$, and $Rb_2O$, and the borate-based glass material is configured to achieve at least a 3.5-log kill rate of at least one of *E. coli*, *P. gingivalis*, or *S. mutans* bacteria.

21 Claims, 2 Drawing Sheets

(56) References Cited

OTHER PUBLICATIONS

Rahaman et al; "Bioactive Glass in Tissue Engineering" ; Acta Biomater, 2011, 7: pp. 2355-2373.
Yue et al; "Fiber Spinnability of Glass Melts", Int. J. Appl. Glass Sci. 2017, 8: pp. 37-47.
Zhang et al; "Antibacterial Effects and Dissolution Behavior of Six Bioactive Glasses"; J Biomed Mater Res A, 2010, 93A: pp. 475-483.

* cited by examiner

BIOACTIVE BORATE GLASSES

CROSS-REFERENCE TO RELATED APPLICATIONS

This application is a continuation of International Application No. PCT/US19/61080 filed on Nov. 13, 2019, which claims the benefit of priority of U.S. Provisional Application Ser. No. 62/769,829 filed on Nov. 20, 2018 and U.S. Provisional Application Ser. No. 62/805,497 filed on Feb. 14, 2019 the contents of which are relied upon and incorporated herein by reference in their entirety as if fully set forth below.

BACKGROUND

1. Field

The disclosure relates to bioactive glasses for use in biomedical applications. In particular, the glasses described herein are borate glasses that show fast filling rates of dentin tubules and have advantageous release rates of metal ions, which provide advantages in antibacterial applications and wound healing.

2. Technical Background

Bioactive glasses are a group of glass and glass ceramic materials that have shown biocompatibility or bioactivity, which has allowed them to be incorporated into human or animal physiology. A number of these materials exist on the market already, such as Bioglass 8625, a soda-lime glass used for encapsulation of implanted devices, and Bioglass 45S5, a bioactive glass composition used in bone repair. However, there continues to be an unmet need for solutions to biomedical problems that novel biocompatible inorganic compositions may help resolve.

This disclosure presents improved biocompatible inorganic compositions and methods of manufacturing thereof for biomedical applications.

SUMMARY

In some embodiments, an antibacterial composition, comprises: a borate-based glass material having a composition of: 0-25 wt. % $SiO_2$, 30-75 wt. % $B_2O_3$, 0-10 wt. % $P_2O_5$, 0-30 wt. % $Al_2O_3$, 0-5 wt. % $Li_2O$, 1-25 wt. % $Na_2O$, 0-15 wt. % $K_2O$, 0-10 wt. % MgO, 10-25 wt. % CaO, 12-30 wt. % MO, 8-25 wt. % $R_2O$, and 30-75 ($B_2O_3+Al_2O_3$), wherein at least one of $P_2O_5$ or $Al_2O_3$ is present, wherein MO is the sum of MgO, CaO, SrO, and BaO, wherein $R_2O$ is the sum of $Na_2O$, $K_2O$, $Li_2O$, and $Rb_2O$, and wherein the borate-based glass material is configured to achieve at least a 3.5-log kill rate of at least one of E. coli, P. gingivalis, or S. mutans bacteria.

In one aspect, which is combinable with any of the other aspects or embodiments, the glass material is a particle, bead, particulate, fiber, woolen mesh, or combination thereof.

In one aspect, which is combinable with any of the other aspects or embodiments, the glass material has at least one size dimension in a range of 1-100 µm.

In one aspect, which is combinable with any of the other aspects or embodiments, the glass material has at least one size dimension in a range of 1-10 µm.

In one aspect, which is combinable with any of the other aspects or embodiments, the glass material has a minimal inhibitory concentration (MIC) of at most 20 mg/mL in the composition.

In one aspect, which is combinable with any of the other aspects or embodiments, the glass material has a minimal inhibitory concentration (MIC) in a range of 20 to 50 mg/mL in the composition.

In one aspect, which is combinable with any of the other aspects or embodiments, the borate-based glass material is configured to achieve at least a 6-log kill rate of at least one of E. coli, P. gingivalis, or S. mutans bacteria.

In one aspect, which is combinable with any of the other aspects or embodiments, the antibacterial composition further comprises: a culture medium having a pH in a range of 7 to 11.

In one aspect, which is combinable with any of the other aspects or embodiments, the antibacterial composition does not comprise silver (Ag)- or copper (Cu)-based materials.

In one aspect, which is combinable with any of the other aspects or embodiments, the antibacterial composition further comprises: 0-25 wt. % $ZrO_2$, and/or 0-10 wt. % ZnO.

In one aspect, which is combinable with any of the other aspects or embodiments, the antibacterial composition is essentially free of or comprises 1 wt. % or less of $SiO_2$, $Li_2O$, and/or ZnO.

In one aspect, which is combinable with any of the other aspects or embodiments, the antibacterial composition comprises: 30-55 wt. % $B_2O_3$.

In some embodiments, an antibacterial composition, comprises: a borate-based glass material having a composition consisting of: 30-55 wt. % $B_2O_3$, 0-10 wt. % $P_2O_5$, 0-25 wt. % $Al_2O_3$, 1-25 wt. % $Na_2O$, 0-15 wt. % $K_2O$, 0-5 wt. % MgO, 10-25 wt. % CaO, 0-20 wt. % $ZrO_2$, 12-30 wt. % MO, 8-25 wt. % $R_2O$, and 30-75 ($B_2O_3+Al_2O_3$), wherein the antibacterial composition is essentially free of or comprises 1 wt. % or less of $SiO_2$, $Li_2O$, and/or ZnO, wherein MO is the sum of MgO and CaO, wherein $R_2O$ is the sum of $Na_2O$ and $K_2O$, and wherein the borate-based glass material is configured to achieve at least a 3.5-log kill rate of at least one of E. coli, P. gingivalis, or S. mutans bacteria.

In one aspect, which is combinable with any of the other aspects or embodiments, the borate-based glass material is configured to achieve at least a 6-log kill rate of each of E. coli, P. gingivalis, and S. mutans bacteria.

BRIEF DESCRIPTION OF THE DRAWINGS

The disclosure will become more fully understood from the following detailed description, taken in conjunction with the accompanying figures, in which.

DETAILED DESCRIPTION

Figure 1:
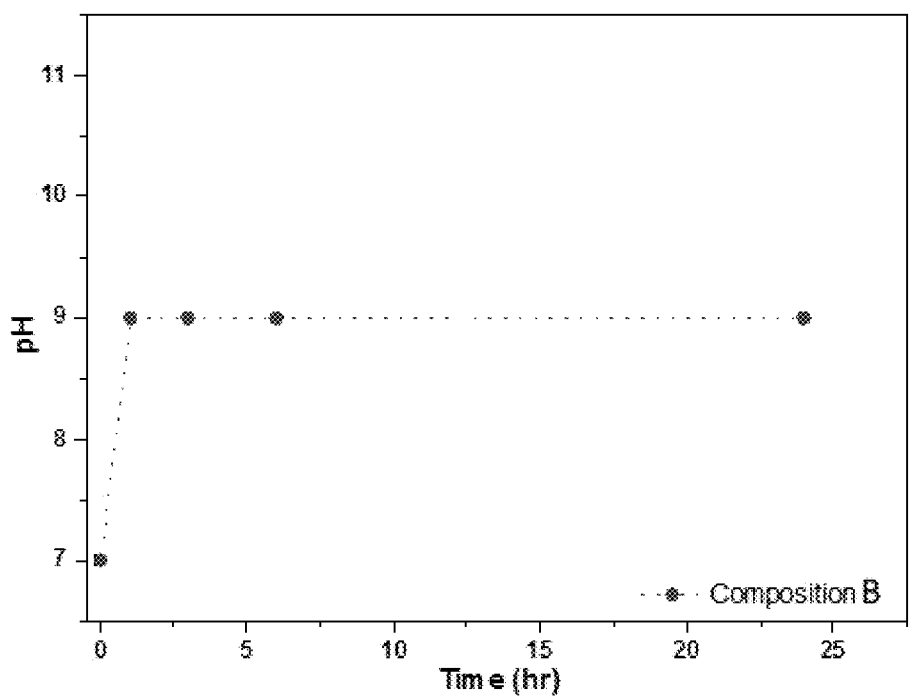
FIG. 1 illustrates pH changes of a culture medium as a function of time after soaking with Example Composition B, according to some embodiments.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free" or "essentially free" of $Al_2O_3$ is one in which $Al_2O_3$ is not actively added or batched into the glass, but may be present in very small amounts as a contaminant (e.g., 500, 400, 300, 200, or 100 parts per million (ppm) or less or).

Herein, glass compositions are expressed in terms of wt % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

Unless otherwise specified, all compositions are expressed in terms of weight percent (wt %). Coefficients of thermal expansion (CTE) are expressed in terms of $10^{-7}/°$ C., unless otherwise specified. The CTE can be determined, for example, using the procedure described in ASTM E228 "Standard Test Method for Linear Thermal Expansion of Solid Materials with a Push-Rod Dilatometer" or ISO 7991: 1987 "Glass—Determination of coefficient of mean linear thermal expansion." The density in terms of grams/cm$^3$ was measured via the Archimedes method (ASTM C693). Young's modulus, shear modulus, and Poisson's Ratio were measured via the ASTM C623 standard.

Glass Compositions

Bioactive glasses are a group of glass and glass ceramic materials that have shown biocompatibility or bioactivity, which has allowed them to be incorporated into human or animal physiology. The biocompatibility and in vivo properties of the glass are influenced by the glass composition. In the glass compositions described herein, $B_2O_3$ serves as the primary glass-forming oxide. Borate glasses are generally much less durable than silicate glasses, making them attractive for fast degradation. However, the potential toxicity caused by the degradation and the difficulties in controlling the degradation rate make using these materials a continuing challenge.

In some examples, the glass comprises a combination of $Na_2O$, $B_2O_3$, and $P_2O_5$. In some examples, the glass may further comprise at least one alkaline earth oxide, such as CaO and/or MgO. In some examples, the glass may further comprise $Al_2O_3$, $K_2O$, and/or $ZrO_2$. For example, the borate-based glass may comprise: 0-25 wt. % $SiO_2$, 30-75 wt. % $B_2O_3$, 0-10 wt. % $P_2O_5$, 0-30 wt. % $Al_2O_3$, 0-5 wt. % $Li_2O$, 1-25 wt. % $Na_2O$, 0-15 wt. % $K_2O$, 0-10 wt. % MgO, 10-25 wt. % CaO, 12-30 wt. % MO, 8-25 wt. % $R_2O$, and 30-75 ($B_2O_3+Al_2O_3$), wherein at least one of $P_2O_5$ or $Al_2O_3$ is present, wherein MO is the sum of MgO, CaO, SrO, and BaO, wherein $R_2O$ is the sum of $Na_2O$, $K_2O$, $Li_2O$, and $Rb_2O$. In some examples, the borate-based glass may also comprise 0-25 wt. % $ZrO_2$, and/or 0-10 wt. % ZnO. In some examples, the borate-based glass may also be essentially free of or comprise 1 wt. % or less of $SiO_2$, $Li_2O$, and/or ZnO. In some examples, the borate-based glass may comprise 30-55 wt. % $B_2O_3$.

$SiO_2$, which is an optional oxide component of the embodied glasses, may be included to provide high temperature stability and chemical durability. In some examples, the glass can comprise 0-25 wt. % $SiO_2$. In some examples, the glass can comprise 10 wt. % or less $SiO_2$. In some examples, the glass can comprise 1 wt. % or less $SiO_2$. In some examples, the glass is essentially free of $SiO_2$. In some examples, the glass can comprise 0-25 wt. %, >0-25 wt. %, 1-25 wt. %, 5-25 wt. %, 10-25 wt. %, 0-20 wt. %, >0-20 wt. %, 1-20 wt. %, 5-20 wt. %, 10-20 wt. %, 0-15 wt. %, >0-15 wt. %, 1-15 wt. %, 5-15 wt. %, 10-15 wt. %, 0-10 wt. %, >0-10 wt. %, 1-10 wt. %, 5-10 wt. %, 0-5 wt. %, >0-5 wt. %, 1-5 wt. %, 0-1 wt. %, >0-1 wt. % $SiO_2$, or any intermediate range therein. In some examples, the glass is essentially free of $SiO_2$ or comprises 0, >0, 1, 2, 3, 4, 5, 6, 7, 8, 9, 10, 11, 12, 13, 14, 15, 16, 17, 18, 19, 20, 21, 22, 23, 24, 25 wt. % $SiO_2$, or any value therebetween.

Without being bound by theory, in borate glasses, $B_2O_3$ is the fundamental glass former due to the higher bond strength, lower cation size, small heat of fusion and trivalent nature of B. In these glasses, $B^{3+}$ ions are triangularly or tetrahedrally coordinated by oxygen and corner-bonded in a random configuration. In some examples, the glass can comprise 30-75 wt. % $B_2O_3$. In some examples, the glass can comprise from 30-60 wt. %, 30-55 wt. %, or 45-75 wt. % $B_2O_3$. In some examples, the glass can comprise from 30-75 wt. %, 30-70 wt. %, 30-65 wt. %, 30-60 wt. %, 30-55 wt. %, 30-50 wt. %, 30-45 wt. %, 30-40 wt. %, 35-75 wt. %, 35-70 wt. %, 35-65 wt. %, 35-60 wt. %, 35-55 wt. %, 35-50 wt. %, 35-45 wt. %, 40-75 wt. %, 40-70 wt. %, 40-65 wt. %, 40-60 wt. %, 40-55 wt. %, 40-50 wt. %, 45-75 wt. %, 45-70 wt. %, 45-65 wt. %, 45-60 wt. %, 45-55 wt. %, 45-50 wt. %, 50-75 wt. %, 50-70 wt. %, 50-65 wt. %, 50-60 wt. %, 55-75 wt. %, 55-70 wt. %, 55-65 wt. %, 55-60 wt. %, 60-75 wt. %, 60-70 wt. %, 65-75 wt. % $B_2O_3$, or any intermediate range therein. In some examples, the glass can comprise about 30, 35, 40, 45, 50, 55, 65, 70, 75 wt. % $B_2O_3$, or any value therebetween.

The addition of alumina ($Al_2O_3$) to borate glasses leads to significant changes in the boron speciation, as 4-coordinated aluminum also requires charge stabilization, either through alkali cations or through formation of 5- and 6-fold coordinated aluminum. The introduction of $Al_2O_3$ in sodium borate glasses can lead to improved mechanical properties like hardness and, crack resistance. $Al_2O_3$ may also influence the structure of the glass and, additionally, lower the liquidus temperature and coefficient of thermal expansion, or enhance the strain point. In addition to its role as a network former, $Al_2O_3$ (and $ZrO_2$) help improve the chemical durability in borate glass while having no toxicity concerns. In some examples, the glass can comprise 0-30 wt. % $Al_2O_3$. In some examples, the glass can comprise from 5-30 wt. % $Al_2O_3$. In some examples, the glass can comprise from 0 to 5 wt. %, 0 to <1 wt. %, or is essentially free of $Al_2O_3$. In some examples, the glass can comprise from 0-30 wt. %, 5-30 wt. %, 10-30 wt. %, 15-30 wt. %, 20-30 wt. %, 25-30 wt. %, 0-25 wt. %, 5-25 wt. %, 10-25 wt. %, 15-25 wt. %, 20-25 wt. %, 0-20 wt. %, 5-20 wt. %, 10-20 wt. %, 15-20 wt. %, 0-15 wt. %, 5-15 wt. %, 10-15 wt. %, 0-10 wt. %, 5-10 wt. %, 0-5 wt. %, >0-30 wt. %, >0-25 wt. %, >0-20 wt. %, >0-15 wt. %, >0-10 wt. %, >0-5 wt. %, 0-1 wt. %, >0-1 wt. %, 0-<1 wt. % $Al_2O_3$, or any intermediate range therein. In some examples, the glass can comprise about 0, >0, <1, 1, 2, 3, 4, 5, 6, 7, 8, 9, 10, 11 12, 13, 14, 15, 16, 17, 18, 19, 20, 21, 22, 23, 24, 25, 26, 27, 28, 29, 30 wt. % $Al_2O_3$, or any value therebetween.

Boron and aluminum speciation depend on the modifier type and content, the amount of borate and alumina in the glass and the Al/B ratio. In some examples, the glass can comprise 30-75 wt. % of the sum of $B_2O_3$ and $Al_2O_3$. In some examples, the glass can comprise from 45-75 wt. %, 45-70 wt. %, 45-65 wt. %, 45-60 wt. %, 45-55 wt. %, 45-50 wt. %, 50-75 wt. %, 50-70 wt. %, 50-65 wt. %, 50-60 wt. %, 55-75 wt. %, 55-70 wt. %, 55-65 wt. %, 55-60 wt. %, 60-75 wt. %, 60-70 wt. %, 65-75 wt. %, or any intermediate range therein, of the sum of $B_2O_3$ and $Al_2O_3$. In some examples, the glass can comprise about 45, 50, 55, 65, 70, 75 wt. %, or any value therebetween, of the sum of $B_2O_3$ and $Al_2O_3$.

Phosphorus pentoxide ($P_2O_5$) also serves as a network former. Furthermore, the liberation of phosphate ions to the surface of bioactive glasses contributes to the formation of apatite. The inclusion of phosphate ions in the bioactive glass increases apatite formation rate and the binding capacity of the bone tissue. In addition, $P_2O_5$ increases the viscosity of the glass, which in turn expands the range of operating temperatures, and is therefore an advantage to manufacture and formation of the glass. In some examples, the glass can comprise 0-10 wt. % $P_2O_5$. In some examples, the glass can comprise from >0 to 10 wt. %, >0 to 8 wt. %, >0 to 6 wt. %, >0 to 4 wt. %, >0 to 2 wt. %, 1 to 10 wt. %, 1 to 8 wt. %, 1 to 6 wt. %, 1 to 4 wt. %, 1 to 2 wt. %, 3 to 8 wt. %, 3 to 6 wt. %, 3 to 10 wt. %, 5 to 8 wt. %, 5 to 10 wt. %, 7 to 10 wt. %, 8 to 10 wt. % $P_2O_5$, or any intermediate range therein. In some examples, the glass can comprise about >0, 1, 2, 3, 4, 5, 6, 7, 8, 9, 10 wt. % $P_2O_5$, or any value therebetween.

Alkali oxides ($Li_2O$, $Na_2O$, $K_2O$, $Rb_2O$, or $Cs_2O$) serve as aids in achieving low melting temperature and low liquidus temperatures. Meanwhile, the addition of alkali oxides can improve bioactivity. Further, $Na_2O$ and $K_2O$ may influence the coefficient of thermal expansion, especially at low temperatures.

In some examples, the glass can comprise from 1-25 wt. % $Na_2O$. In some examples, the glass can comprise 4-22 wt. % $Na_2O$. In some examples, the glass can comprise 2-8 wt. % $Na_2O$. In some examples, the glass can comprise 15-25 wt. % $Na_2O$. In some examples, the glass can comprise from 1-25 wt. %, 2-25 wt. %, 4-25 wt. %, 5-25 wt. %, 8-25 wt. %, 10-25 wt. %, 15-25 wt. %, 20-25 wt. %, 1-22 wt. %, 2-22 wt. %, 4-22 wt. %, 5-22 wt. %, 8-22 wt. %, 10-22 wt. %, 15-22 wt. %, 1-18 wt. %, 2-18 wt. %, 4-18 wt. %, 5-18 wt. %, 8-18 wt. %, 10-18 wt. %, 1-15 wt. %, 2-15 wt. %, 4-15 wt. %, 5-15 wt. %, 8-15 wt. %, 10-15 wt. %, 1-10 wt. %, 2-10 wt. %, 4-10 wt. %, 5-10 wt. %, 1-8 wt. %, 2-8 wt. %, 4-8 wt. % $Na_2O$, or any intermediate range therein. In some examples, the glass can comprise 1, 2, 3, 4, 5, 6, 7, 8, 10, 12, 15, 18, 20, 22, 25 wt. % $Na_2O$, or any value therebetween.

In some examples, the glass can comprise from 3 to 20 wt. % $K_2O$. In some examples, the glass can comprise 0-15 wt. % $K_2O$. In some examples, the glass can comprise 5-15 wt. % $K_2O$. In some examples, the glass can comprise 0-5 wt. % $K_2O$. In some examples, the glass can comprise from 0-15 wt. %, >0-15 wt. %, 2-15 wt. %, 5-15 wt. %, 8-15 wt. %, 10-15 wt. %, 0-10 wt. %, >0-10 wt. %, 2-10 wt. %, 5-10 wt. %, 0-8 wt. %, >0-8 wt. %, 2-8 wt. %, 5-8 wt. %, 0-5 wt. %, >0-5 wt. %, 2-5 wt. %, 7-12 wt. %, 8-12 wt. %, 8-11 wt. % $K_2O$, or any intermediate range therein. In some examples, the glass can comprise 0, >0, 1, 2, 3, 4, 5, 6, 7, 8, 9, 10, 11, 12, 13, 14, 15, 16, 17, 18, 19, 20 wt. % $K_2O$, or any value therebetween.

In some examples, the total amount of $Na_2O$ and $K_2O$ is important to the properties of the glass. In such examples, the glass can comprise 15-25 wt. % $Na_2O$ and 0-5 wt. % $K_2O$. In some examples, the glass can comprise 1-10 wt. % $Na_2O$ and 5-15 wt. % $K_2O$.

In some examples, $Li_2O$ may be present and in such examples, the glass can comprise from 0-5 wt. % $Li_2O$. In some examples, the glass can comprise from >0-5 wt. % $Li_2O$. In some examples, the glass can comprise from about >0-3.5 wt. % $Li_2O$. In some examples, the glass can comprise from 1-4 wt. % $Li_2O$. In some examples, the glass can comprise from 0-5 wt. %, 0-4 wt. %, 0-3 wt. %, 0-2 wt. %, >0 to 5 wt. %, >0 to 4 wt. %, >0 to 3 wt. %, >0 to 2 wt. %, 1 to 5 wt. %, 1 to 4 wt. %, 1 to 3 wt. % $Li_2O$, or any intermediate range therein. In some examples, the glass can comprise about 0, >0, 1, 2, 3, 4, 5 wt. % $Li_2O$, or any value therebetween.

In some examples, the total amount of the alkalis $Li_2O$, $Na_2O$, and $K_2O$ ($R_2O$) is important to the glass properties. In some examples, the glass can comprise 8-25 wt. % $R_2O$, wherein $R_2O$ is the sum or $Li_2O$, $Na_2O$, and $K_2O$. In some examples, the glass can comprise 8 to 20 wt. % $R_2O$. In some examples, the glass can comprise 8 to 15 wt. % $R_2O$. In some examples, the glass can comprise from 8-25 wt. %, 8-22 wt. %, 8-18 wt. %, 8-15 wt. %, 10-25 wt. %, 10-22 wt. %, 10-20 wt. %, 10-18 wt. %, 10-15 wt. %, 12-25 wt. %, 12-22 wt. %, 12-20 wt. %, 12-18 wt. %, 15-25 wt. %, 15-22 wt. %, 15-20 wt. %, 18-25 wt. %, 18-22 wt. % $R_2O$, or any intermediate range therein. In some examples, the glass can comprise 8, 9, 10, 11, 12, 13, 14, 15, 16, 17, 18, 19, 20, 21, 22, 23, 24, 25 wt. % $R_2O$, or any value therebetween.

Divalent cation oxides (such as alkaline earth oxides) also improve the melting behavior and the bioactivity of the glass. Particularly, CaO is found to be able to react with $P_2O_5$ to form apatite when immersed in a simulated body fluid (SBF) or in vivo. The release of $Ca^{2+}$ ions from the surface of the glass contributes to the formation of a layer rich in calcium phosphate.

In some examples, the glass can comprise 10-25 wt. % CaO. In some examples, the glass can comprise 12-25 wt. % CaO. In some examples, the glass can comprise 14 to 22 wt. % $R_2O$. In some examples, the glass can comprise from 10-25 wt. %, 10-22 wt. %, 10-18 wt. %, 10-15 wt. %, 12-25 wt. %, 12-22 wt. %, 12-20 wt. %, 12-18 wt. %, 12-15 wt. %, 15-25 wt. %, 15-22 wt. %, 15-20 wt. %, 15-18 wt. %, 18-25 wt. %, 18-22 wt. %, 18-20 wt. %, 20-25 wt. %, 20-22 wt. % CaO, or any intermediate range therein. In some examples, the glass can comprise 10, 11, 12, 13, 14, 15, 16, 17, 18, 19, 20, 21, 22, 23, 24, 25 wt. % CaO, or any value therebetween.

In some examples, the glasses comprise MgO. In some examples, the glass can comprise 0-10 wt. % MgO. In some examples, the glass can comprise from 0 to 5 wt. % MgO. In some examples, the glass can comprise from >0 to 10 wt. %, 3 to 10 wt. %, or 3 to 8 wt. % MgO. In some examples, the glass can comprise from 0 to 10 wt. %, 0 to 8 wt. %, 0 to 6 wt. %, 0 to 4 wt. %, 0 to 2 wt. %, >0 to 10 wt. %, >0 to 8 wt. %, >0 to 6 wt. %, >0 to 4 wt. %, >0 to 2 wt. %, 1 to 10 wt. %, 1 to 8 wt. %, 1 to 6 wt. %, 1 to 4 wt. %, 1 to 2 wt. %, 3 to 8 wt. %, 3 to 6 wt. %, 3 to 10 wt. %, 5 to 8 wt. %, 5 to 10 wt. %, 7 to 10 wt. %, 8 to 10 wt. % MgO, or any intermediate range therein. In some examples, the glass can comprise about 0, >0, 1, 2, 3, 4, 5, 6, 7, 8, 9, 10 wt. % MgO, or any value therebetween.

Strontium oxide (SrO) may be present in some examples and in such examples, the glass can comprise from 0 to 10 wt. % SrO. In some examples, the glass can comprise from >0 to 10 wt. % SrO. In some examples, the glass can comprise from 3 to 10 wt. %, 5 to 10 wt. %, 5 to 8 wt. % SrO. In some examples, the glass can comprise from 0 to 10 wt. %, 0 to 8 wt. %, 0 to 6 wt. %, 0 to 4 wt. %, 0 to 2 wt. %, >0 to 10 wt. %, >0 to 8 wt. %, >0 to 6 wt. %, >0 to 4 wt. %, >0 to 2 wt. %, 1 to 10 wt. %, 1 to 8 wt. %, 1 to 6 wt. %, 1 to 4 wt. %, 1 to 2 wt. %, 3 to 8 wt. %, 3 to 6 wt. %, 3 to 10 wt. %, 5 to 8 wt. %, 5 to 10 wt. %, 7 to 10 wt. %, 8 to 10 wt. % SrO, or any intermediate range therein. In some examples, the glass can comprise about 0, >0, 1, 2, 3, 4, 5, 6, 7, 8, 9, 10 wt. % SrO, or any value therebetween.

Barium oxide (BaO) may be present in some examples and in such examples, the glass can comprise from 0 to 15 wt. % BaO. In some examples, the glass can comprise from 0 to 10 wt. %, >0 to 5 wt. %, 6 to 13 wt. %, 5 to 15 wt. %, 7 to 13 wt. %, 7 to 11 wt. %, 8 to 12 wt. % BaO. In some examples, the glass can comprise from 0 to 15 wt. %, 0 to 13 wt. %, 0 to 11 wt. %, 0 to 9 wt. %, 0 to 7 wt. %, 0 to 5 wt. %, >0 to 15 wt. %, >0 to 13 wt. %, >0 to 11 wt. %, >0 to 9 wt. %, >0 to 7 wt. %, >0 to 5 wt. %, 1 to 15 wt. %, 1 to 13 wt. %, 1 to 11 wt. %, 1 to 9 wt. %, 1 to 7 wt. %, 1 to 5 wt. %, 3 to 15 wt. %, 3 to 13 wt. %, 3 to 11 wt. %, 3 to 9 wt. %, 3 to 7 wt. %, 3 to 5 wt. %, 5 to 15 wt. %, 5 to 13 wt. %, 5 to 11 wt. %, 5 to 9 wt. %, 5 to 7 wt. %, 7 to 15 wt. %, 7 to 13 wt. %, 7 to 11 wt. %, 7 to 9 wt. %, 9 to 15 wt. %, 9 to 13 wt. %, 9 to 11 wt. %, 11 to 15 wt. %, 11 to 13 wt. % BaO, or any intermediate range therein. In some examples, the glass can comprise about 0, >0, 1, 2, 3, 4, 5, 6, 7, 8, 9, 10, 11, 12, 13, 14, 15 wt. % BaO, or any value therebetween.

Alkaline earth oxides may improve other desirable properties in the materials, including influencing the Young's modulus and the coefficient of thermal expansion. In some examples, the glass comprises from 11-30 wt. % MO (12 wt. % ≤ MO ≤ 30 wt. %), where M is the sum of the alkaline earth metals Mg, Ca, Sr, and Ba, in the glass. In some examples, the glass can comprise from 12 to 25 wt. % MO. In some examples, the glass can comprise about 11, 12, 13, 14, 15, 16, 17, 18, 19, 20, 21, 22, 23, 24, 25, 26, 27, 28, 29, 30 wt. % MO, or any value therebetween.

In some examples, the glasses comprise ZnO. In some examples, the glass can comprise 0-10 wt. % ZnO. In some examples, the glass can comprise from 0 to 5 wt. % ZnO. In some examples, the glass can comprise from >0 to 10 wt. %, 3 to 10 wt. %, or 3 to 8 wt. % ZnO. In some examples, the glass can comprise from 0 to 10 wt. %, 0 to 8 wt. %, 0 to 6 wt. %, 0 to 4 wt. %, 0 to 2 wt. %, >0 to 10 wt. %, >0 to 8 wt. %, >0 to 6 wt. %, >0 to 4 wt. %, >0 to 2 wt. %, 1 to 10 wt. %, 1 to 8 wt. %, 1 to 6 wt. %, 1 to 4 wt. %, 1 to 2 wt. %, 3 to 8 wt. %, 3 to 6 wt. %, 3 to 10 wt. %, 5 to 8 wt. %, 5 to 10 wt. %, 7 to 10 wt. %, 8 to 10 wt. % ZnO, or any intermediate range therein. In some examples, the glass can comprise about 0, >0, 1, 2, 3, 4, 5, 6, 7, 8, 9, 10 wt. % ZnO, or any value therebetween.

In some examples, the glass can comprise 0-25 wt. % $ZrO_2$. In some examples, the glass can comprise from 0-25 wt. %, 2-25 wt. %, 4-25 wt. %, 5-25 wt. %, 8-25 wt. %, 10-25 wt. %, 15-25 wt. %, 20-25 wt. %, 0-22 wt. %, 2-22 wt. %, 4-22 wt. %, 5-22 wt. %, 8-22 wt. %, 10-22 wt. %, 15-22 wt. %, 0-18 wt. %, 2-18 wt. %, 4-18 wt. %, 5-18 wt. %, 8-18 wt. %, 10-18 wt. %, 0-15 wt. %, 2-15 wt. %, 4-15 wt. %, 5-15 wt. %, 8-15 wt. %, 10-15 wt. %, 0-10 wt. %, 2-10 wt. %, 4-10 wt. %, 5-10 wt. %, 0-8 wt. %, 2-8 wt. %, 4-8 wt. % $Na_2O$, or any intermediate range therein. In some examples, the glass can comprise 0, 1, 2, 3, 4, 5, 6, 7, 8, 10, 12, 15, 18, 20, 22, 25 wt. % $ZrO_2$, or any value therebetween.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In some examples, the glass may comprise one or more compounds useful as ultraviolet radiation absorbers. In some examples, the glass can comprise 3 wt. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some examples, the glass can comprise from 0 to about 3 wt. %, 0 to about 2 wt. %, 0 to about 1 wt. %, 0 to 0.5 wt. %, 0 to 0.1 wt. %, 0 to 0.05 wt. %, or 0 to 0.01 wt. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to some examples, can also include various contaminants associated with batch materials and/or introduced into the glass by the melting, fining, and/or forming equipment used to produce the glass. For example, in some examples, the glass can comprise from 0 to about 3 wt. %, 0 to about 2 wt. %, 0 to about 1 wt. %, 0 to about 0.5 wt. %, 0 to about 0.1 wt. %, 0 to about 0.05 wt. %, or 0 to about 0.01 wt. % $SnO_2$ or $Fe_2O_3$, or combinations thereof.

Non-limiting examples of amounts of precursor oxides for forming the embodied glasses are listed in Table 1, along with the properties of the resulting glasses.

TABLE 1

| Oxide (wt %) | A | B | C | D | E | F | G | H | I | J | K |
|---|---|---|---|---|---|---|---|---|---|---|---|
| $SiO_2$ | 0 | 0 | 0 | 0 | 0 | 0 | 0 | 0 | 0 | 0 | 0 |
| $B_2O_3$ | 53.4 | 50.5 | 41.8 | 37.2 | 32.8 | 45.8 | 43.3 | 52.5 | 49.1 | 46.2 | 43.6 |
| $P_2O_5$ | 3.4 | 3.2 | 3.4 | 3.3 | 3.3 | 5.3 | 5.0 | 3.3 | 3.2 | 2.9 | 2.8 |
| $Al_2O_3$ | 5.7 | 10.8 | 17.2 | 22.6 | 27.7 | 5.8 | 11.0 | 0 | 0 | 0 | 0 |
| $Li_2O$ | 0 | 0 | 0 | 0 | 0 | 0 | 0 | 0 | 0 | 0 | 0 |
| $Na_2O$ | 5.2 | 4.9 | 5.2 | 5.1 | 5.1 | 21.6 | 20.4 | 5.2 | 4.8 | 4.5 | 4.2 |
| $K_2O$ | 10.5 | 9.9 | 10.5 | 10.3 | 10.1 | 0 | 0 | 10.3 | 9.6 | 9.0 | 8.5 |
| MgO | 4.4 | 4.1 | 4.4 | 4.3 | 4.2 | 0 | 0 | 4.3 | 4.0 | 3.8 | 3.6 |
| CaO | 17.4 | 16.5 | 17.5 | 17.2 | 16.9 | 21.5 | 20.3 | 17.1 | 16.0 | 15.1 | 14.2 |
| ZnO | 0 | 0 | 0 | 0 | 0 | 0 | 0 | 0 | 0 | 0 | 0 |
| $ZrO_2$ | 0 | 0 | 0 | 0 | 0 | 0 | 0 | 6.8 | 12.7 | 18.0 | 22.6 |

The glass compositions disclosed herein can be in any form that is useful for the medical and dental processes disclosed. The compositions can be in the form of, for example, particles, powder, microspheres, fibers, sheets, beads, scaffolds, woven fibers.

Processes for Making Glasses

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1250–1650° C. for times ranging from about 6-16 hours. The melts can thereafter be poured into steel molds to yield glass slabs. Subsequently, those slabs can be transferred immediately to an annealer operating at about 500-650° C., where the glass is held at temperature for about 1 hour and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to about 1650° C. and held at temperature for about 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 m can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Glass Bioactivity

Aspects are related to compositions or matrices containing embodied bioactive glass compositions and the methods of using the matrices to treat medical conditions. The matrices can be a toothpaste, mouthwash, rinse, spray, ointment, salve, cream, bandage, polymer film, oral formulation, pill, capsule, transdermal formulation, and the like. The bioactive glass compositions claimed can be physically or chemically attached to matrices or other matrix components, or simply mixed in. As noted above, the bioactive glass can be in any form that works in the application, including particles, beads, particulates, short fibers, long fibers, or woolen meshes. The methods of using the glass-containing matrices to treat a medical condition can be simply like the use of matrix as normally applied.

E. Coli Applications

Glass particles comprising the compositions disclosed herein may demonstrate strong antimicrobial effectiveness against *E. coli* bacteria. A minimal inhibitory concentration (MIC, corresponding to a 6-log kill rate) as low as 20 mg/mL was determined for Example Composition B and as low as 50 mg/mL was determined for Example Composition H, both from Table 1.

Testing for the *E. coli* kill rate was determined by first culturing the test bacteria in a suitable medium for 16 to 18 hrs till a saturation point and calculating bacteria concentration by spectrophotometer. Thereafter, the *E. coli* bacteria (107 live *E. coli*) medium is infused with varying concentrations of glass particles. For example, each broth comprises approximately 5 mL of *E. coli* bacteria medium and 0.5, 1, 10, 20, 50, or 200 mg of glass particles per mL of broth, respectively. In addition, a separate broth comprises *E. coli* bacteria medium without glass particles. The inoculation of the bacteria/glass is cultured for 24 hrs and thereafter, 10 μL bacteria/broth is plated and cultured for an additional 16 hrs on Agar plates. After culturing, the *E. coli* colony number for each condition (glass types, concentrations) is counted.

Figure 2:
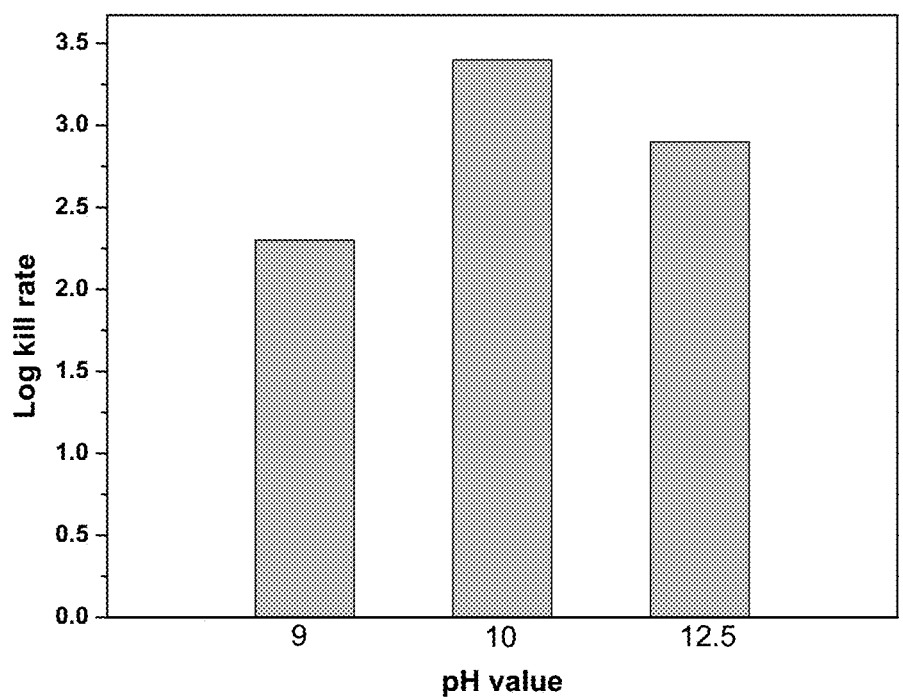
FIG. 2 illustrates a bar graph plot of kill rate of E. coli as a function of pH change of a culture medium, according to some embodiments.
Figure 3:
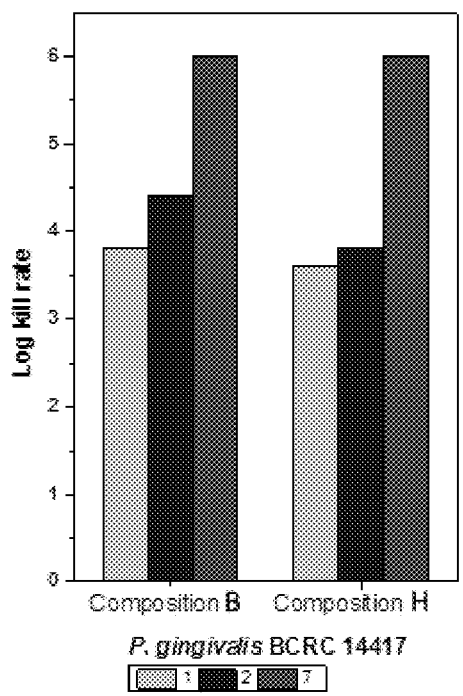
FIG. 3 illustrates a bar graph plot of the kill rate of P. Gingivalis after 1, 2 and 7 days of incubation with Example Compositions B and H, according to some embodiments.

Depending on the Example Glass composition, MIC may vary from 20 to 50 mg/mL. In some examples, antimicrobial effectiveness is associated with alkali and alkali earth ion release from the glass particles. This release may be suggested by pH changes of the broth during testing. For example, FIG. 1 illustrates pH changes of the culture medium as a function of time after soaking with Example Composition B, according to some embodiments. Rapid pH changes occur from pH=7 to pH=9 within the first 1-2 hrs of culturing and then relatively stabilizes at the upper pH bound thereafter. However, increases of pH alone cannot achieve the required 6-log bacteria kill rates. FIG. 2 illustrates a bar graph plot of kill rate of *E. coli* as a function of pH change of a culture medium, according to some embodiments. None of pH=9, pH=10, or pH=12.5 culture mediums are able to achieve 6-log bacteria kill rates. Although addition of NaOH to the culture medium shows an inhibitory effect on *E. coli* growth, a maximum 3.4-log kill rate was reached at pH=10 (FIG. 2). Further increases to pH do not show advantageous inhibitory effect on the bacteria. Without being bound to theory, it is believed that multiple killing mechanisms, which include pH changes and alkali/alkali earth ion-bacterial interaction, account for the excellent antimicrobial effectiveness from the disclosed compositions.

*P. Gingivalis/S. Mutans* Applications

Figure 4:
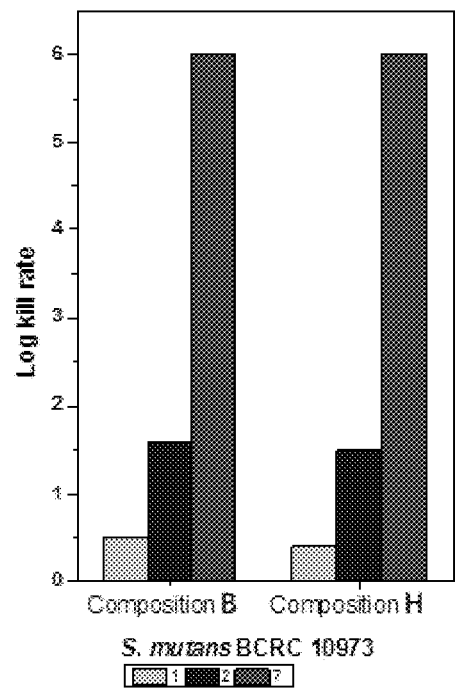
FIG. 4 illustrates a bar graph plot of the kill rate of S. Mutans after 1, 2 and 7 days of incubation with Examples Compositions B and H, according to some embodiments.

Antibacterial effectiveness may also be demonstrated against other bacteria, such as *P. gingivalis* and *S. mutans*, which are two representative oral bacteria in dental applications. *P. gingivalis* is associated with chronic periodontitis, while *S. mutans* is associated with oral cavity. All disclosed compositions (for example, those in Table 1) demonstrated a 6-log kill rate after 7 days in medium containing either *P. gingivalis* or *S. mutans* bacteria. For example, FIGS. 4 and 5 illustrate bar graph plots of the kill rate of *P. Gingivalis* and *S. Mutans*, respectively, after 1, 2 and 7 days of incubation with Example Compositions B and H, according to some embodiments. Moreover, Example Compositions B and H both demonstrate greater than a 3.5-log kill rate to *P. Gingivalis* after only 1 day of incubation, thereafter increasing to a 6-log kill rate after 7 days of incubation. Example Compositions B and H both demonstrate a 6-log kill rate to *S. mutans* bacteria after 7 days of incubation. The antibacterial effectiveness against at least these two representative oral bacteria implies the potential improvement to human oral care using the disclosed glass compositions.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass composition, comprising:
   a borate-based glass material having a composition of:
   0-25 wt. % $SiO_2$,
   30-75 wt. % $B_2O_3$,
   0-10 wt. % $P_2O_5$,
   0-30 wt. % $Al_2O_3$,
   0-5 wt. % $Li_2O$,
   1-25 wt. % $Na_2O$,
   0-15 wt. % $K_2O$,
   0-10 wt. % MgO,
   10-25 wt. % CaO,
   >0-25 wt. % $ZrO_2$;
   12-30 wt. % MO,
   8-25 wt. % $R_2O$, and
   30-75 ($B_2O_3+Al_2O_3$)
   wherein at least one of $P_2O_5$ or $Al_2O_3$ is present,
   wherein MO is the sum of MgO, CaO, SrO, and BaO,
   wherein $R_2O$ is the sum of $Na_2O$, $K_2O$, $Li_2O$, and $Rb_2O$, and
   wherein the borate-based glass material exhibits at least a 3.5-log kill rate of at least one of *E. coli, P. gingivalis*, or *S. mutans* bacteria.

2. The glass composition of claim 1, wherein the glass material is a particle, bead, particulate, fiber, woolen mesh, or combination thereof.

3. The glass composition of claim 2, wherein the glass material has at least one size dimension in a range of 1-100 μm.

4. The glass composition of claim 2, wherein the glass material has at least one size dimension in a range of 1-10 μm.

5. The glass composition of claim 1, wherein the glass material has a minimal inhibitory concentration (MIC) of at most 20 mg/mL in the composition.

6. The glass composition of claim 1, wherein the glass material has a minimal inhibitory concentration (MIC) in a range of 20 to 50 mg/mL in the composition.

7. The glass composition of claim 1, wherein the borate-based glass material exhibits at least a 6-log kill rate of at least one of *E. coli, P. gingivalis*, or *S. mutans* bacteria.

8. The glass composition of claim 1, wherein
   the glass composition is a component of an antimicrobial composition, and the antimicrobial composition further comprises a culture medium having a pH in a range of 7 to 11.

9. The glass composition of claim 1, wherein the glass composition does not comprise silver (Ag)- or copper (Cu)-based materials.

10. The glass composition of claim 1, further comprising:
    >0-10 wt. % ZnO.

11. The glass composition of claim 1, wherein the glass composition comprises 1 wt. % or less of each of $SiO_2$, $Li_2O$, and ZnO.

12. The glass composition of claim 1, wherein the glass composition comprises:
    30-55 wt. % $B_2O_3$.

13. An glass composition, comprising:
    a borate-based glass material having a composition consisting of:
    30-55 wt. % $B_2O_3$,
    0-10 wt. % $P_2O_5$,
    0-25 wt. % $Al_2O_3$,
    1-25 wt. % $Na_2O$,
    0-15 wt. % $K_2O$,
    0-5 wt. % MgO,
    10-25 wt. % CaO,
    >0-25 wt. % $ZrO_2$;
    0-20 wt. % $ZrO_2$,
    12-30 wt. % MO,
    8-25 wt. % $R_2O$, and
    30-75 ($B_2O_3+Al_2O_3$),
    wherein the glass composition comprises 1 wt. % or less of each of $SiO_2$, $Li_2O$, and ZnO,
    wherein MO is the sum of MgO and CaO, wherein $R_2O$ is the sum of $Na_2O$ and $K_2O$, and wherein the borate-based glass material exhibits at least a 3.5-log kill rate of at least one of *E. coli, P. gingivalis,* or *S. mutans* bacteria.

14. The glass composition of claim 13, wherein the borate-based glass material exhibits at least a 6-log kill rate of each of *E. coli, P. gingivalis,* and *S. mutans* bacteria.

15. A glass composition comprising, wt %:
0-25 $SiO_2$
30-75 $B_2O_3$
0-10 $P_2O_5$
0-30 $Al_2O_3$
0-5 $Li_2O$
1-25 $Na_2O$
0-15 $K_2O$
0-10 MgO
10-25 CaO
>0-25 $ZrO_2$;
12-30 MO
8-25 $R_2O$, and
45-75 ($B_2O_3$+$Al_2O_3$)
wherein at least one of $P_2O_5$ or $Al_2O_3$ has to be present, MO is the sum of MgO, CaO, SrO, and BaO, $R_2O$ is the sum of $Na_2O$, $K_2O$, $Li_2O$, and $Rb_2O$.

16. The glass composition of claim 15, wherein the glass composition comprises:
4-22 wt % $Na_2O$.

17. The glass composition of claim 15, wherein the glass composition comprises:
2-8 wt % $Na_2O$.

18. The glass composition of claim 15, wherein the glass composition comprises:
15-25 wt % $Na_2O$.

19. The glass composition of claim 15, wherein the glass composition comprises:
15-25 wt % $Na_2O$ and
0-5 wt % $K_2O$.

20. The glass composition of claim 15, wherein the glass composition comprises:
1-10 wt % $Na_2O$ and
5-15 wt % $K_2O$.

21. The glass composition of claim 15, wherein the glass composition comprises:
$B_2O_3$ within a range of from 30 wt % to 55 wt %;
$P_2O_5$ within a range of from 1 wt % to 6 wt %;
$Na_2O$ within a range of from 4 wt % to 22 wt %;
CaO within a range of from 15 wt % to 22 wt %; and
$ZrO_2$ within a range of from 6 wt % to 23 wt %; and
the glass composition is essentially free of $SiO_2$, $Li_2O$, ZnO, and $Al_2O_3$.

* * * * *